Oct. 15, 1929.  J. A. WRIGHT  1,731,962
REAR AXLE ASSEMBLY
Filed Dec. 8, 1927  2 Sheets-Sheet 2
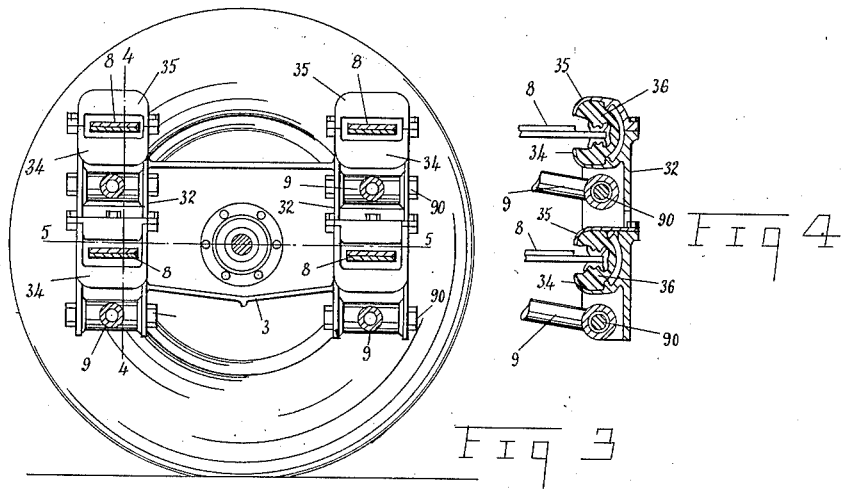
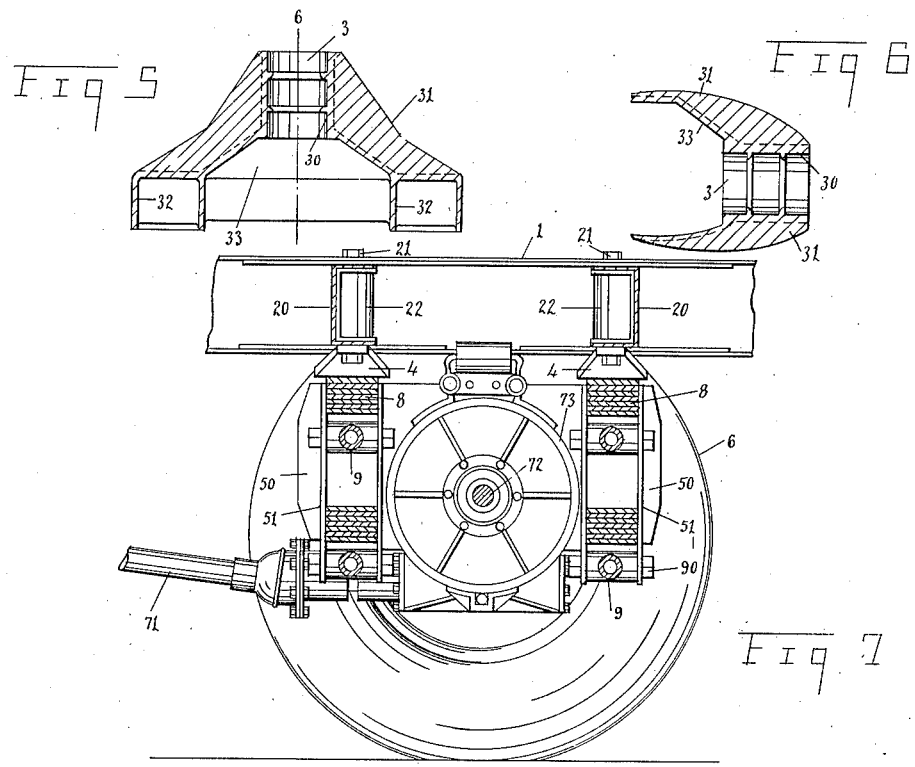
INVENTOR
James A. Wright
By
ATTORNEY Patented Oct. 15, 1929

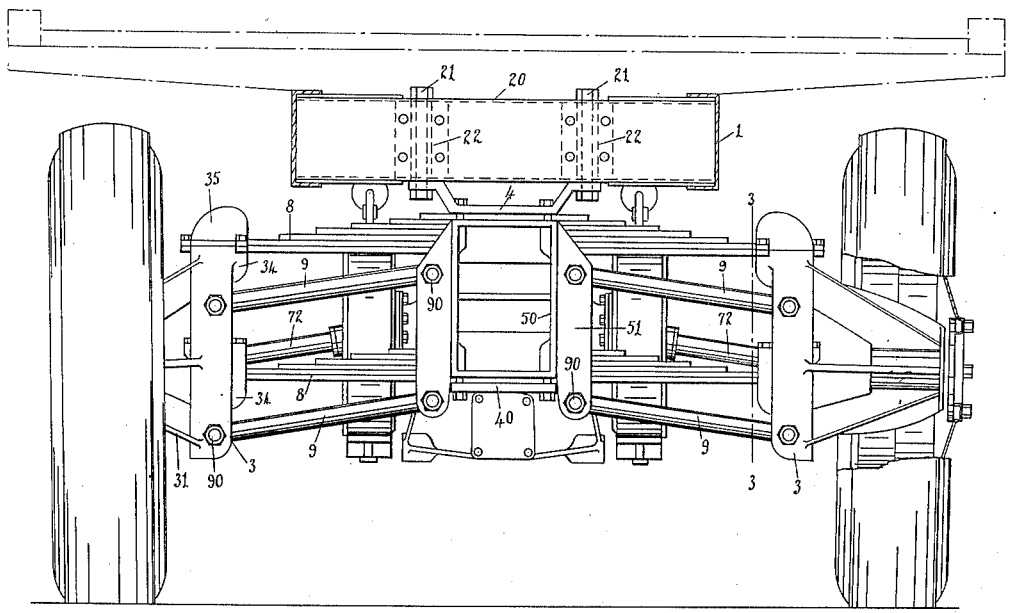

1,731,962

UNITED STATES PATENT OFFICE

JAMES A. WRIGHT, OF MONTREAL, QUEBEC, CANADA

REAR-AXLE ASSEMBLY

Application filed December 8, 1927. Serial No. 238,684.

This invention relates to motor vehicles and more particularly to the rear axle assembly and wheel mounting in such vehicles of the truck type.

The object of my invention is to provide an improved form of transverse spring suspension including wheel carriers of novel design, a differential casing having novel features and a special form of anchorage for the springs in the wheel carriers.

Further objects will be set forth hereinafter.

Owing to the type of vehicle of which they form parts, the differential casing and wheel carriers require to be of the strongest and most durable construction. The heavy load of trucks on rough roads creating severe stresses which must be received without risk of damage.

Reference is made to the accompanying drawings in which:—

Fig. 1 is a rear view.

Fig. 2 is a plan view.

Fig. 3 is a vertical section on the line 3—3 of Fig. 1, looking to the right.

Fig. 4 is a vertical section on the line 4—4 of Fig. 3.

Fig. 5 is a horizontal cross section on the line 5—5 of Fig. 3.

Fig. 6 is a vertical cross section on the line 6—6 of Fig. 5.

Fig. 7 is a vertical section on the line 7—7 of Fig. 2.

The differential casing 5, has extensions 50, at each end, rectangular in shape, providing seats above and below for the transverse springs. These extensions 50, have outwardly projecting ribs 51, in which the inner ends of the radius rods 9, are pivoted on the bolts 90.

Anchor plates 4 and 40, bolted to the casing 5, secure the springs 8, in their seats. The anchor plate 4, has upwardly projecting ends to form brackets, which are bolted to the cross channel 20, by the bolts 21, through blocks 22, secured to the cross channel 20.

The main driving shaft 71, connects with a worm drive at the bottom of the casing 5, which drives the differential and the spindles 72, operating the wheels 6.

The wheel carriers 3, have ribs 31, on sleeves 30, which carry vertical channels 32, at each side of the flared extensions 33.

In the channels 32, are integral cups 34, with removable covers 35, and bolts 90, on which the ends of the radius rods 9, are pivoted.

The ends of the springs 8, are housed in rubber blocks 36, in the cups 34, held securely in position by the covers 35.

As shown in Figure 3, each wheel carrier 3, is connected with the casing 5, by two pairs of spring 8, and two pairs of radius rods 9, at either side of the wheel axis, and maintain the parallel relation of the casing 5, and the wheel carrier 3, during the flexure of the springs 8.

The brake drums 73, on either side of the casing 5, have their bands anchored to the base of the casing by pins entering sockets. The brake control mechanism is secured to the upper edge of the casing 5.

With this construction a differential casing is provided in which the transverse springs are securely housed in seats above and below the end extensions of the casing which end extensions are centrally mounted below the frame cross members. The load is therefore transmitted directly from the frame to the wheel carriers through the springs, the casing forming practically a central member of the frame and providing additional strength to that section of it.

The channels at each side of the wheel carriers and the radiating ribs which extend to the outer end of the sleeve in which the wheel is journalled, provides a construction of great strength and of minimum weight.

What I claim is:—

1. In a device of the class specified, a wheel carrier comprising a sleeve, an outwardly flared extension thereto, parallel vertical channels to the flared extension and oblique radiating ribs about the sleeve and flared extension extending to the vertical channels.

2. In a device of the class specified, a wheel carrier comprising a sleeve, a flared extension thereto, vertical channels on each side of the flared extension and oblique radiating ribs about the sleeve and flared extension, with upper and lower integral cups in each channel having removable covers thereto.

3. In a device of the class specified, a wheel carrier comprising a sleeve, a flared extension thereto, vertical channels on each side of the flared extension and oblique radiating ribs about the sleeve and flared extension, with upper and lower integral cups in each channel having removable covers thereto, with transverse bolts below each cup adapted to pivot radius rods.

4. In a device of the class specified, a differential casing, rectangular end extensions thereto with transverse channels above and below the extensions, adapted to provide seats for transverse springs, with outwardly projecting ribs on each side of the spring seats, and bolts through the ribs below each spring, adapted to pivot radius rods.

5. In a device of the class specified, a differential casing, rectangular end extensions thereto, with transverse spring seats therein above and below, anchor plates to the seats, the upper anchor plates secured at each end to the cross members of the chassis frame, transverse springs mounted in the seats, outwardly projecting ribs on the end extensions on each side of the springs, radius rods pivoted between the ribs below each spring, and wheel carriers in which the ends of the springs are housed, and to which the radius rods are pivoted.

6. In a device of the class specified, a differential casing, rectangular end extensions thereto adapted to provide seats above and below for transverse springs, springs mounted in the seats, vertical outwardly projecting ribs on the end extensions between which radius rods are pivoted below each spring, with wheel carriers having vertical channels at each side in which the ends of the springs are housed and the radius rods are pivoted.

7. In a device of the class specified, a differential casing having rectangular end extensions centrally secured to cross members of the chassis frame, transverse springs seated in the end extensions, radius rods pivoted in outwardly projecting ribs below each spring, with wheel carriers having vertical channels on each side, with integral cups therein and removable covers thereto, rubber blocks mounted on the ends of the springs, housed in the cups and radius rods pivoted in the channels below each cup.

8. In a device of the class specified, a differential casing having end extensions centrally secured to the cross members of the chassis frame, transverse springs seated in the end extensions, wheel carriers having vertical channels on each side in which the ends of the springs are housed, wheels journalled on the wheel carriers, operated by flexible axles from the differential, brake drums mounted on each side of the differential, brake bands anchored to the differential casing and brake control mechanism secured to the differential casing.

JAMES A. WRIGHT.